United States Patent
Laemmle et al.

(10) Patent No.: US 11,145,456 B2
(45) Date of Patent: Oct. 12, 2021

(54) ENERGY TRANSFORMERS FOR NON-CONTACT ENERGY TRANSMISSION AND TRACTION ACCUMULATOR CHARGING SYSTEM

(71) Applicant: Mahle International GmbH, Stuttgart (DE)

(72) Inventors: Christopher Laemmle, Stuttgart (DE); Timo Laemmle, Kernen (DE); Holger Schroth, Maulbronn (DE)

(73) Assignee: Mahle International GmbH

(*) Notice: Subject to any disclaimer, the term of this patent is extended or adjusted under 35 U.S.C. 154(b) by 0 days.

(21) Appl. No.: 16/992,084

(22) Filed: Aug. 12, 2020

(65) Prior Publication Data

US 2021/0050148 A1    Feb. 18, 2021

(30) Foreign Application Priority Data

Aug. 13, 2019    (DE) ...................... 10 2019 212 151.9

(51) Int. Cl.
| | |
|---|---|
| *H01F 38/14* | (2006.01) |
| *H01F 5/00* | (2006.01) |
| *B60L 53/12* | (2019.01) |
| *H02J 50/00* | (2016.01) |
| *H02J 50/10* | (2016.01) |

(52) U.S. Cl.
CPC ............... *H01F 38/14* (2013.01); *H01F 5/00* (2013.01); *B60L 53/12* (2019.02); *H01F 2005/006* (2013.01); *H02J 50/005* (2020.01); *H02J 50/10* (2016.02)

(58) Field of Classification Search
CPC ...... H01F 38/14; H01F 5/00; H01F 2005/006; H02J 50/10; H02J 50/005; B60L 53/12
USPC ........................................................ 307/149
See application file for complete search history.

(56) References Cited

U.S. PATENT DOCUMENTS

| | | | |
|---|---|---|---|
| 9,735,606 B2* | 8/2017 | Koyanagi | ............... H02J 7/025 |
| 9,812,875 B2 | 11/2017 | Nejatali et al. | |
| 9,824,805 B2 | 11/2017 | Wechlin et al. | |
| 9,935,481 B2* | 4/2018 | Yamaguchi | ............. H02J 50/40 |

(Continued)

FOREIGN PATENT DOCUMENTS

| | | |
|---|---|---|
| DE | 102012103315 A1 | 10/2013 |
| EP | 3483906 A1 | 5/2019 |

(Continued)

*Primary Examiner* — Alfonso Perez Borroto
(74) *Attorney, Agent, or Firm* — Fishman Stewart PLLC

(57) ABSTRACT

An energy transmitter for a contactless energy transmission may include a coil device and a magnetic conducting body. The coil device may be configured to at least one of i) provide and ii) receive a magnetic field. The coil device may include a coil arranged on a coil-facing first large magnetic body surface of the magnetic conducting body. The coil may include a plurality of coil windings each of which may be circumferentially arranged about an imaginary coil winding centre and define a coil winding circumferential length. A plurality of imaginary circumference section areas may each extend along the coil winding circumferential length of a corresponding coil winding through the magnetic conducting body between the two large magnetic body surfaces. At least two circumference section areas of the plurality of circumference section areas may be substantially identical to one another in terms of area.

20 Claims, 5 Drawing Sheets

(56) References Cited

U.S. PATENT DOCUMENTS

| | | | |
|---|---|---|---|
| 2010/0277004 A1* | 11/2010 | Suzuki | H01F 38/14 307/104 |
| 2010/0320843 A1 | 12/2010 | Kitamura et al. | |
| 2011/0050382 A1* | 3/2011 | Baarman | H01F 27/255 336/221 |
| 2012/0187757 A1* | 7/2012 | Wechlin | H02J 50/10 307/9.1 |
| 2013/0270921 A1 | 10/2013 | Boys et al. | |
| 2015/0022020 A1* | 1/2015 | Borngraber | H02J 7/025 307/104 |
| 2015/0367739 A1 | 12/2015 | Boser et al. | |
| 2016/0111208 A1 | 4/2016 | Park et al. | |
| 2017/0103850 A1* | 4/2017 | Furiya | H01F 21/02 |
| 2017/0264131 A1* | 9/2017 | An | H02J 50/10 |
| 2018/0175670 A1* | 6/2018 | Hidaka | H02J 50/90 |

FOREIGN PATENT DOCUMENTS

| | | |
|---|---|---|
| WO | WO-13051947 A1 | 4/2013 |
| WO | WO-19057777 A1 | 3/2019 |

* cited by examiner

ENERGY TRANSFORMERS FOR NON-CONTACT ENERGY TRANSMISSION AND TRACTION ACCUMULATOR CHARGING SYSTEM

CROSS-REFERENCE TO RELATED APPLICATIONS

This application claims priority to German Patent Application No. DE 10 2019 212 151.9, filed on Aug. 13, 2019, the contents of which is hereby incorporated by reference in its entirety.

TECHNICAL FIELD

The invention relates to an energy transmitter for a contactless energy transmission. The invention, furthermore, relates to a traction accumulator charging system.

BACKGROUND

Energy transmitters for a contactless energy transmission are usually utilised in order to supply drive-utilised traction accumulators orating accumulators of mobile equipment such as for example electric motor vehicles, mobile working machines or mobile telephones with energy in a contactless manner, i.e. in particular without electrically contacting plugs or cables.

In the document WO 2013/051947 A1, an inductive energy transmitter is described, which comprises a housing with multiple side walls. In the housing, one or more coils are arranged in order to provide a magnetic alternating field for the contactless energy transmission within the housing. The density of the coils varies with the distance to the side walls. Furthermore it is described that the energy transmitter comprises magnetically permeable layers, wherein the layer thickness or the permeability of the layers varies.

Energy transmitters generally comprise coils for providing a magnetic field and magnetic conducting bodies for conducting the magnetic field. The latter generally have an inhomogeneous flux density distribution which, compared with the maximum magnetic charge that is theoretically possible, which in technical circles is referred to by the term "saturation flux density", results in a relatively low magnetic charge. The inhomogeneous flux density distribution furthermore causes an uneven distribution of the generated magnetic power dissipation, which is usually accompanied by an inhomogeneous temperature load of the magnetic conducting body. Inhomogeneous temperature loads however can result in undesirable thermomagnetic effects and thermo-mechanical effects.

SUMMARY

The object of the invention therefore lies in providing an improved or at least another embodiment for an energy transmitter. Furthermore, the object of the invention is to state a traction accumulator charging system having an energy transmitter.

In the present invention, this object is accomplished in particular through the subject matter of the independent claim(s). Advantageous embodiments are subject of the dependent claim(s) and of the description.

The basic idea of the invention lies in configuring the inhomogeneous flux density distribution on the magnetic conducting body as homogeneous as possible through design measures in order to thereby achieve on the magnetic conducting body a relatively high magnetic flux density and at the same time a relatively low thermal load. This leads, furthermore, to a reduction of the weight, which in particular when used in a motor vehicle is a particular advantage.

To this end it is provided that an energy transmitter for a contactless energy transmission, in particular an induction coil device of a traction accumulator charging system suitable for electric motor vehicles, comprises a coil device, in particular a transmitter coil device and/or a receiver coil device for providing or receiving a magnetic field for a contactless energy transmission and a preferentially ferritic magnetic conducting body comprising two large magnetic body surfaces, for conducting, in particular for conducting and/or guiding the magnetic field provided or received by the coil device. The coil device comprises a coil arranged on a large magnetic body surface preferentially facing the coil, which are circumferentially arranged coil-like, practically spirally, about an imaginary coil winding centre of the coil. Each coil winding circumferential length which can be stated for example in meters (m). It is substantial that between the two large magnetic body surfaces one or more imaginary circumference section areas are defined, which in each case run along a coil winding circumferential length of a coil winding through the magnetic conducting body between the two large magnetic body surfaces. Practically, a circumference section area can be indicated in square meters ($m^2$). According to the invention, the magnetic conducting body is configured so that at least two circumference section areas, which are in particular radially adjacent to one another, are substantially identical to one another in terms of area. This has the effect that for each coil winding circumferential length there is the same circumference section area in the magnetic conducting body.

Concretely it can be said that the nearer to a coil winding centre a coil winding is arranged, i.e. the smaller the radius of the coil winding is, the smaller are also the coil winding circumferential length and the circumference section area in the magnetic conducting body, which has to be passed by the magnetic flux. Thus, the circumference section area decreases while the magnetic flux remains the same. The magnetic flux density in the magnetic conducting body therefore increases with decreasing radius. In an idealised case, this behaviour for a coil with circular winding is linear. In any case, the configuration of the magnetic conducting body is preferably achieved by adapting the material thickness of the magnetic conducting body, for example the material thickness, starting out from the coil winding centre, decreases radially to the outside, preferentially through a sloping of one of the large magnetic body surfaces. By way of this it is achieved that at any point of the magnetic conductor a homogeneous process quantity can be adjusted, for example a homogeneous magnetic flux density or a homogenous temperature distribution.

Practically, the circumference section areas of at least two or all coil windings are identical to one another. By way of this, an advantageous configuration of the magnetic conducting body directly by way of the circumference section areas becomes possible, so that in the result a desired relatively homogenous distribution of a magnetic field density on the magnetic conducting body and/or a temperature distribution on the magnetic conducting body is adjustable.

Further practically, a circumference section area can define a reference ratio, with respect to which the remaining circumference section areas deviate by a maximum of 1%, 2%, 3%, 4%, 5%, 6%, 7%, 8%, 9% or 10%, quasi like a tolerance band by the reference ratio. Furthermore, a circumference section area can define a reference ratio with respect to which the remaining circumference section areas deviate by a predetermined or predeterminable parameter. For example, the parameter or factor is given by a random numerical value, in particular 0.5; 1.0; 1.5; 2.0; 2.5; 3 etc. Furthermore, a circumference section area can define a reference ratio, with regard to which the remaining circumference section areas deviate according to a predetermined or predeterminable deviation function. For example, the deviation function is a linear or non-linear function. Altogether, this opens up the design possibility of favourably configuring the magnetic conducting body with respect to a relatively homogeneous distribution of the magnetic flux density and/or temperature.

Practically, the circumference section areas are configured stepped relative to one another. By way of this, the magnetic conducting body is realised quasi not flat but in individual terrace-like steps. Practically, the circumference section areas, in particular starting out from a reference ratio of a coil winding arranged next on the coil winding centre relative to one another can be stepped from the coil winding centre decreasing radially to the outside. By way of this, the magnetic conducting body can be configured relatively high on the coil winding centre, i.e. with a relatively large material thickness. Furthermore, the circumference section areas, in particular starting out from a reference ratio of a coil winding arranged next to the coil winding centre, relative to one another can be increasingly stepped away from the coil winding centre. By way of this, the magnetic conducting body is quasi configured relatively thin on the coil winding centre, i.e. with a relatively small material thickness. Altogether, a preferred design configuration of the magnetic conducting body can thereby be directly achieved by way of the circumference section areas in order to adjust a desired homogeneous distribution of a magnetic field density.

It is also conceivable that the magnetic conducting body is embodied in one piece or multiple parts. For example, a multiple-part magnetic conducting body preferentially comprises at least two tile bodies which are formed for example by triangular, rectangular or polygonal, in particular level flat bodies that can be joined in the manner of a puzzle. Furthermore, the tile bodies can form the magnetic conducting body.

Preferably, the tile bodies are powder-metallurgically produced as part of a sintering method. By way of this, the production of a magnetic conducting body can be carried out relatively cost-effectively. The tile bodies preferably have contact edges or contact surfaces that have been surface-ground in a grinding method, practically the contact edges or contact surfaces are embodied straight and not bent, so that the tile bodies can be relatively easily assembled to form a magnetic conducting body in the manner of a puzzle Surface-ground contact edges or contact surfaces have the advantage that between the tile bodies merely small intermediate gaps are formed. This brings with it the advantage that the magnetic flux density is relatively homogeneous even in the region of the intermediate gaps.

Furthermore, each tile body can comprise two large tile body surfaces that are orientated opposite to one another in particular of level configuration. It is practical when the two large tile body surfaces are configured parallel to one another or substantially parallel to one another, so that quasi a cuboid tile body is defined. Furthermore, at least one of the two large tile body surfaces of a tile body can be embodied domed, curved or, according to a predeterminable contour function, in particular a linear or non-linear contour function, or relative to the respective other large tile body surface, so that for example a wedge-shaped tile body or a tile body with complex surface contour profile is realised. In this context, "domed" does not necessarily mean a curved surface. The curved surface can also be composed of multiple linear part surfaces that are inclined relative to one another. Practically, the one or other large tile body surface of least one tile body can be configured zigzag-like in the manner that one or both large tile body surfaces form two or more terrace-like surface portions in particular flat portions in each case. In particular, the large tile body surfaces, in particular the top and bottom, can be delimited by flat surfaces in order to favour the production of the tile bodies.

In particular, the magnetic conducting body can comprise on the or in the region about the coil winding centre, a recess reducing the material thickness of the magnetic conducting body or a magnetic conducting body recess penetrating the magnetic conducting body, in particular completely, for example in order to provide an installation space for components of a power electronic system, in particular an oscillating circuit or the like.

It is practical when the large magnetic body surfaces are orientated parallel to one another. Alternatively to this it has proved to be advantageous to configure the second large magnetic body surface of the magnetic conducting body facing away from the coil flat, i.e. without curvature, and the first large magnetic body surface facing the coil, domed, in particular conical, truncated cone-like, pyramid-like or stepped pyramid-like. The respective dome apex of the first large magnetic body surface preferably faces away from the second large magnetic body surface and, with respect to the magnetic conducting body, is arranged centrally.

Practically, the magnetic conducting body can be produced from a ferritic metal material.

Further practically, the coil windings are arranged on the first large magnetic body surface facing the coil with a gap, in particular with a gap of 0.1 mm, 0.2 mm, 0.5 mm, 1.0 mm, 1.5 mm, 2.0 mm, 2.5 mm, 3.0 mm, 4.0 mm or 5.0 mm. Here, a filler material can be theoretically employed additionally in order to fill the gap between the coil windings and the first large magnetic body surface, while the filler material is for example an adhesive, preferentially an adhesive with a relatively good heat conductivity. Alternatively to this, the coil windings can be preferably arranged on the coil-facing first large magnetic body surface without gap and in contact with the same. Here, too, it is conceivable to employ a filler material, for example an adhesive, preferentially an adhesive with a relatively good heat conductivity in order to fix the coil windings to the magnetic conducting body.

Preferentially it is provided that a coil winding of a coil defines a flat winding plane, in this case the coil can be referred to for example as circular flat coil. Alternatively to this, a coil winding of a coil can define a conical coil tapered surface, a pyramid-shaped coil pyramid surface or a stepped pyramid-shaped coil stepped pyramid surface. As a result, a coil winding deviating from the level configuration is thereby created which can adapt relatively closely to a domed magnetic conducting body.

Furthermore, a, preferentially multi-part, housing for receiving the coil device and the magnetic conducting body can be provided. Here, the housing can preferably comprise a housing cover for covering a housing bowl of the housing that is suitable for receiving the coil device and the magnetic conducting body. By way of this, the components of the energy transmitter can be protected from environmental influences, for example in order to minimise dirt ingress. The housing cover and/or the housing bowl are preferably designed so that a desired, preferentially minimal, influencing of the magnetic field is achievable.

The invention comprises the further basic idea of stating a traction accumulator charging system, in particular for a motor vehicle or for an electric motor vehicle. For this purpose, a traction accumulator charging system is provided with an energy transmitter, in particular an induction coil device, and a counter energy transmitter, in particular a counter induction coil device. The energy transmitter preferentially comprises a coil device, by means of which a magnetic field is providable, and a magnetic conducting body for conducting the provided magnetic field. These components are preferably arranged in a housing that is for example lowerable into the ground and preferentially produced in multiple parts and from plastic material or a composite material. The mentioned counter energy transmitter is preferably installable on a motor vehicle and further preferably on an electric motor vehicle. It comprises a receiver coil device which can interact with the coil device of the energy transmitter in an energy-transmitting manner and which is preferably constructed identically or similarly to the coil device so that a preferentially drive-utilised traction accumulator arranged in the respective motor vehicle or electric motor vehicle can be charged. Here it is practical when the coil device and/or the receiver coil device and/or the magnetic conducting body of the coil device and/or receiver coil device are embodied according to the one or other above-described object. In this way, a traction accumulator of a motor vehicle or of an electric motor vehicle can be charged relatively efficiently because the coil device and/or the receiver coil device and/or the magnetic conducting body of the coil device and/or receiver coil device allow a relatively energy-efficient operation of the energy transmitter.

Within the scope of these documents, the terms "multiple" or "a plurality" are to be understood as "exactly two", "at least two" or "more than two". A person skilled in the art understands the term "coil winding" as being those portions of a coil which, starting out from any starting point of the coil, circulate complete, i.e. by 360°, about a coil winding centre of the coil. Coil windings circulating about the coil winding centre less than completely are referred to as part coil winding, for example a half, i.e. 180°, circulating half coil winding about the coil winding centre.

Preferably, both the radial position and also the axial position of the coil winding cross section can largely develop randomly about an axis of the coil winding centre during the course of a coil winding or of a part coil winding based on the cylindrical coordinate system. In particular, besides a spirally flat coil winding, rectangular and/or pyramid-like rising coil windings or part coil windings are also conceivable.

According to a further or optional basic idea of the invention it is provided to configure the inhomogeneous flux density distribution on the magnetic conducting body through further design measures as homogeneously as possible in order to thereby achieve on the magnetic conducting body a relatively high magnetic charge and simultaneously a relatively lower thermal load.

For this purpose it is provided that an energy transmitter for a contactless energy transmission comprises in particular an induction coil device of a traction accumulator charging system suitable for electric motor vehicles, a coil device for providing a magnetic field for a contactless energy transmission or for receiving a magnetic field from a contactless energy transmission and a preferentially ferritic magnetic conducting body comprising two large magnetic body surfaces for conducting the magnetic field provided by the coil device. The coil device comprises a coil arranged on a preferentially coil-facing first large magnetic body surface with multiple coil windings which are arranged about an imaginary coil winding centre of the coil in a coil-like, quasi spirally circulating manner. Each coil winding defines a coil winding circumferential length which can be indicated for example in metres (m). Here it is now essential that a magnetic conducting body thickness of the magnetic conducting body defined between the two large magnetic body surfaces, in the circumferential direction round about the coil winding centre, is adaptable in terms of thickness at any point along a coil winding circumferential length according to a predetermined or predeterminable change function. Because of this, the magnetic conducting body thickness is preferentially thicker or thinner in edge regions or corner edge regions of the magnetic conducting body than in intermediate edge regions of the magnetic conducting body between the edge regions or the corner edge regions. This has the advantage that a particularly homogeneous distribution of the flux density distribution is realisable. Furthermore, this likewise leads to a reduction of the weight of the magnetic conducting body, which in particular when used in a motor vehicle is of particular advantage.

Practically, the change function can be a jump function and/or a linear or non-linear change function that is in particular dependent on the respective angle position and continuous.

Further practically, the change function can be configured so that a wave-shaped thickness profile of the magnetic conducting body in the circumferential direction round about the coil winding centre is realised along a coil winding circumferential length. In this case, the surface, in particular the one or other large magnetic body surface of the magnetic conducting body is practically realised so that wave crests and wave troughs follow one another preferably so that wave crests or wave troughs are arranged in edge regions or corner edge regions of the magnetic conducting body.

In particular, the energy transmitter can comprise a magnetic conducting body which is formed by a round flat body or a quadrangular flat body, in particular with or without rounded corners, or a polygonal flat body, in particular with or without rounded corners.

Furthermore, the energy transmitter can comprise a magnetic conducting body formed in one piece or comprise a magnetic conducting body that is embodied in multiple pieces and comprises at least two tile bodies. Here, the tile bodies are preferentially formed in each case by triangular, quadrangular or polygonal flat bodies assembled puzzle-like. The individual flat bodies can have rounded corners.

According to a further or optional basic idea of the invention it is provided to provide a transmitter coil energy transmitter with a coil device, in particular for an induction coil device of a traction accumulator charging system suitable for electric motor vehicles. The coil device of the transmitter coil energy transmitter serves for providing a magnetic field for a contactless energy transmission and comprises a magnetic conducting body equipped with two large magnetic body surfaces for conducting the magnetic field. Furthermore, the coil device comprises a coil with multiple coil windings arranged on a coil-facing first large magnetic body surface. Each coil device circulates about an imaginary coil winding centre of the coil and in the process defines a coil winding circumferential length. It is substantial that between the two large magnetic body surfaces imaginary circumference section areas are defined, which each run along a coil winding circumferential length of a coil winding through the magnetic conducting body between the two large magnetic body surfaces, wherein the magnetic conducting body is configured so that at least two circumference section areas are substantially identical to one another in terms of area. On the whole, a preferred design configuration of the magnetic conducting body can thereby be directly achieved by way of the circumference section areas in order to adjust a desired homogeneous distribution of a magnetic flux density.

Furthermore it is alternatively or additionally conceivable to provide a transmitter coil energy transmitter with a coil device, in particular an induction coil device of a traction accumulator charging system suitable for electric motor vehicles, which is equipped with a coil device for providing a magnetic field for a contactless energy transmission and with a magnetic conducting body comprising two large magnetic body surfaces for conducting the magnetic field. Here, the coil device has a coil with multiple coil windings arranged on a coil-facing first large magnetic body surface, wherein each coil winding is arranged circulating coil-like along a circumferential direction about an imaginary coil winding centre of the coil, in order to thereby define a coil winding circumferential length. In this it is substantial that a magnetic conducting body thickness of the magnetic conducting body defined between the two large magnetic body surfaces is adaptable in the circumferential direction round about the coil winding centre at any point along a coil winding circumferential length according to a predetermined or predeterminable change function in such a manner that the magnetic conducting body thickness is thicker or thinner preferentially in edge regions or corner edge regions of the magnetic conducting body than in intermediate edge regions of the magnetic conducting body between the edge regions or the corner edge regions. On the whole, a preferred design configuration of the magnetic conducting body can thereby be likewise directly achieved by means of the magnetic conducting body thickness in order to adjust a desired homogeneous distribution of a magnetic field density.

According to a further or optional basic idea of the invention it is provided to provide a receiver coil energy transmitter with a coil device, in particular for an induction coil device of a traction accumulator charging system suitable for electric motor vehicles. The coil device of the receiver coil energy transmitter serves for receiving a magnetic field from a contactless energy transmission and comprises a magnetic conducting body equipped with two large magnetic body surfaces for conducting the magnetic field. Furthermore, the coil device has a coil arranged on a coil-facing first large magnetic body surface with multiple coil windings. Each coil winding circulates about an imaginary coil winding centre of the coil and in the process defines a coil winding circumferential length. It is substantial that between the two large magnetic body surfaces imaginary circumference section areas are defined, which in each case run along a coil winding circumferential length of a coil winding through the magnetic conducting body between the two large magnetic body surfaces, wherein the magnetic conducting body is configured so that at least two circumference section areas are substantially identical to one another in terms of area.

On the whole, a preferred design configuration of the magnetic conducting body can thus be directly achieved by way of the circumference section areas in order to adjust a desired homogeneous distribution of a magnetic field density.

Furthermore it is alternatively or additionally conceivable to provide a receiver coil energy transmitter with a coil device, in particular for an induction coil device of a traction accumulator charging system suitable for electric motor vehicles, which is equipped with a coil device for receiving a magnetic field from a contactless energy transmission, and with a magnetic conducting body comprising two large magnetic body surfaces for conducting the magnetic field. Here, the coil device has a coil arranged on a coil-facing first large magnetic body surface with multiple coil windings, wherein each coil winding is arranged circulating coil-like along a circumferential direction round about an imaginary coil winding centre of the coil in order to thereby define a coil winding circumferential length. Here it is substantial that a magnetic conducting body thickness of the magnetic conducting body defined between the two large magnetic body surfaces is adaptable in the circumferential direction round about the coil winding centre at any point along a coil winding circumferential length according to a predetermined or predeterminable change function in such a manner that the magnetic conducting body thickness is preferentially thicker or thinner in edge regions or corner edge regions of the magnetic conducting body than in intermediate edge regions of the magnetic conducting body between the edge regions or the corner edge regions. On the whole, a preferred design configuration of the magnetic conducting body can thus be likewise achieved by way of the magnetic conducting body thickness in order to adjust a desired homogeneous distribution of a magnetic field density.

In order to achieve a design adaptation of the magnetic conducting body, in particular of the magnetic conducting body thickness of the same, both in the circumferential direction and also in the radial direction it can be provided, furthermore, that an energy transmitter for a contactless energy transmission is equipped with a coil device for providing a magnetic field for a contactless energy transmission or for receiving a magnetic field from a contactless energy transmission, and with a magnetic conducting body comprising two large magnetic body surfaces for conducting the magnetic field. Here, the coil device comprises a coil arranged on a coil-facing first large magnetic body surface with multiple coil windings. Each coil winding is arranged circulating coil-like round about an imaginary coil winding centre of the coil and in the process defines a coil winding circumferential length. Here it is substantial for the invention that between the two large magnetic body surfaces imaginary circumference section areas are defined, which in each case run along a coil winding circumferential length through the magnetic conducting body between the two large magnetic body surfaces. Furthermore it is provided that the magnetic conducting body is configured so that at least two circumference section areas are substantially identical to one another in terms of area and that a magnetic conducting body thickness of the magnetic conducting body defined between the two large magnetic body surfaces is adaptable in the circumferential direction round about the coil winding centre at any point along a coil winding circumferential length according to a predetermined or predeterminable change function in such a manner that the magnetic conducting body thickness in edge regions or corner edge regions of the magnetic conducting body is thicker or thinner than in intermediate edge regions of the magnetic conducting body, which in turn are located between the edge regions or the corner edge regions. By way of this, it is also advantageously achieved that directly by way of the magnetic conducting body thickness of the magnetic conducting body a desired homogeneous distribution of a magnetic field density is adjusted.

In summary it should be noted: the present invention preferably relates to an energy transmitter for a contactless energy transmission, having a coil device and having a magnetic conducting body. The coil device comprises a coil having multiple coil windings arranged on the magnetic conducting body. It is substantial for the invention that between the coil windings and a large magnetic body surface circumference section areas are defined, each of which run along the respective coil winding through the magnetic conducting body.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

It shows, in each case schematically

DETAILED DESCRIPTION

The drawings show altogether preferred exemplary embodiments of an energy transmitter marked with the reference number 1. Such energy transmitters 1 are preferably employed in the automotive sector in order to charge drive-utilised traction accumulators of a motor vehicle, in particular of an electric motor vehicle. For example these are induction coil devices for traction accumulator charging systems 3. However it is conceivable in principle that energy transmitters 1 are also employed in the non-automotive sector, for example with electrically driven working machines or with mobile telephones.

Figure 1:
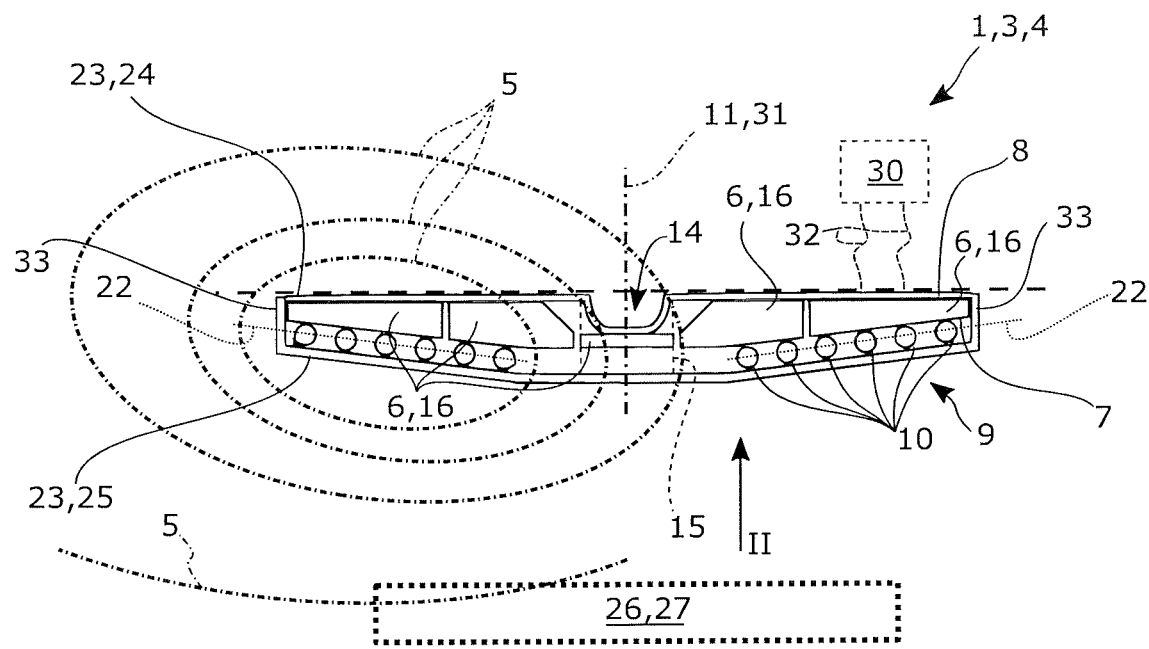
FIG. 1 shows a sectional view of a preferred exemplary embodiment of an energy transmitter, wherein dash-dotted magnetic field lines represent the interaction of the same with a counter-energy transmitter arranged on the energy transmitter.
Figure 2:
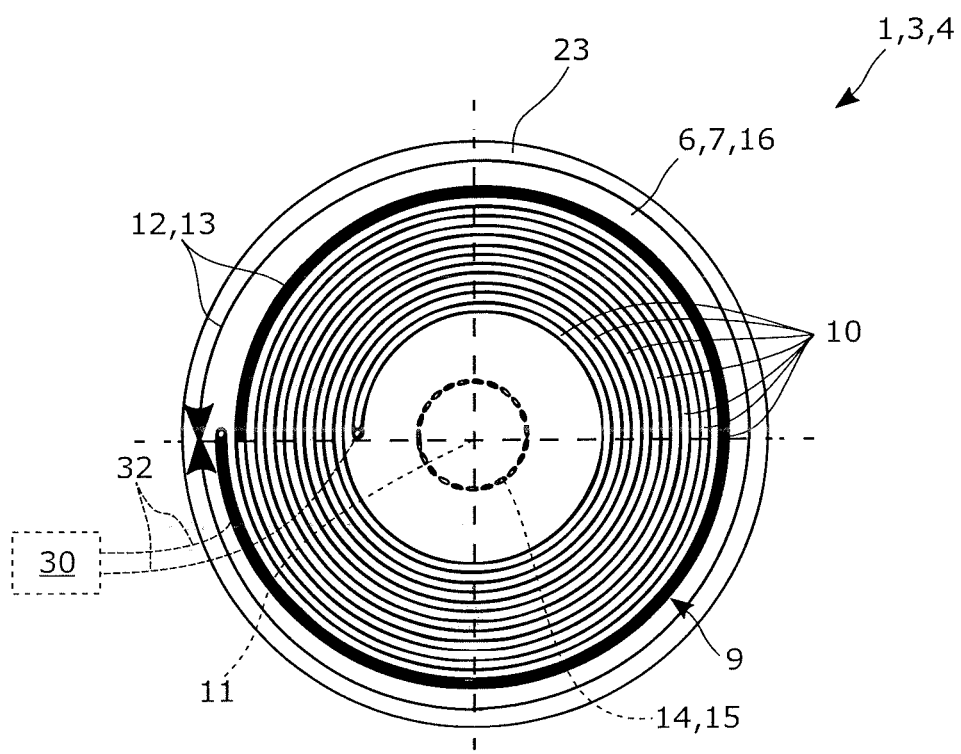
FIG. 2 shows the energy transmitter from FIG. 1 according to an arrow II drawn in there in a view from below, wherein for the purpose of better noticeability a housing of the energy transmitter is partly shown transparently.

FIGS. 1 and 2 show in a sectional view and in a view from below according to an arrow II shown in FIG. 1 a preferred first exemplary embodiment of the energy transmitter 1, wherein in FIG. 1 magnetic field lines 5 of a magnetic field shown in dash-dotted lines illustrate the interaction of the same with a counter-energy transmitter 26 arranged on the energy transmitter 1 in FIG. 1 with receiver coil device 27, in particular a coil device 4, as is exemplarily the case in a traction accumulator charging system 3. For providing the magnetic field indicated by magnetic field lines 5 for a contactless energy transmission, the energy transmitter 1 comprises a coil device 4 and a magnetic conducting body 6 comprising two large magnetic body surfaces 7, 8 for conducting the magnetic field. The coil device 4 and the magnetic conducting body 6 are practically arranged in a housing marked with the reference number 23, which for receiving the coil device 4 and the magnetic conducting body 6 comprises a suitable housing bowl 25 with a bowl mounting and a housing cover 24. The housing cover 24 can be preferably arranged completely contacting the housing bowl 25, in particular in a fluid-tight manner so that the components arranged therein are protected for example from environmental influences.

The coil device 4 according to FIGS. 1 and 2, furthermore, comprises a single coil 9 which by means of supply connections 32 is connectable to a control device 30 shown in FIG. 1 in dashed lines in order to supply and activate the coil device 4. The coil 9 in turn comprises multiple coil windings 10, which define a conical coil tapered surface 22 indicated with dots in FIG. 1. Exemplarily the coil winding is arranged on a coil-facing large magnetic body surface so as to be linearly in contact with the same. However, the coil windings 10 can also be arranged spaced apart, i.e. with an intermediate gap, on the large magnetic body surface 7 in a surface-following manner. Furthermore, the coil windings 10 are preferably arranged spirally or corner-spirally, i.e. in the manner of a coil about an imaginary coil winding centre 11 of the coil 9, circulating coil-like on the large magnetic body surface 7, which is clearly noticeable in particular in FIG. 2. The coil winding centre 11 preferably coincides with a symmetry line of the magnetic conducting body 6 marked with the reference number 31, so that the coil winding centre 11 is arranged quasi centrally and in the middle on the magnetic conducting body 6.

Furthermore it is noticeable according to FIG. 2 that the coil windings 10 each have a coil winding circumferential length 12 along their main extension direction. Here it is preferred when the coil winding circumferential length 12 of a coil winding 10 is defined by a complete circulation of the respective coil winding 10 about the coil winding centre 11, i.e. by 360°. In principle it is conceivable to produce the coil winding 10 in each case from a wire material, for example a copper wire material or the like. In particular, the coil windings 10 can each have a round or oval or rectangularly configured cross section.

The magnetic conducting body marked with the reference number 6 is exemplarily a flat body produced from ferritic material and serves for conducting, in particular for conducting and/or guiding the magnetic field 5 indicated by magnetic field lines 5. The magnetic conducting body 6 comprises the two abovementioned large magnetic body surfaces 7, 8 and a circumferential narrow outer surface 33 connecting these to one another, which delimits the magnetic conducting body 6 quasi radially, see FIG. 1. The two large magnetic body surfaces 7, 8 are preferably of opposite orientation and embodied inclined to one another. Exemplarily, the first large magnetic body surface 7 is orientated at an angle to the second large magnetic body surface 8. In principle, the first large magnetic body surface 7 can be embodied domed or form a conical or a pyramid-shaped outer surface. In any case, the magnetic conducting body 6 according to the exemplary embodiment shown in FIGS. 1 and 2 is embodied in multiple pieces, namely in particular assembled from tile bodies each marked with the reference number 16, and configured exemplarily round on the outside, although a rectangular base area is likewise conceivable. Furthermore, the magnetic conducting body 6 has a central recess 14 on the or in the region around the coil winding centre 11 or a magnetic conducting body recess 15 penetrating the magnetic conducting body 6, in particular completely, which here is merely indicated by a dashed line.

Figure 3:
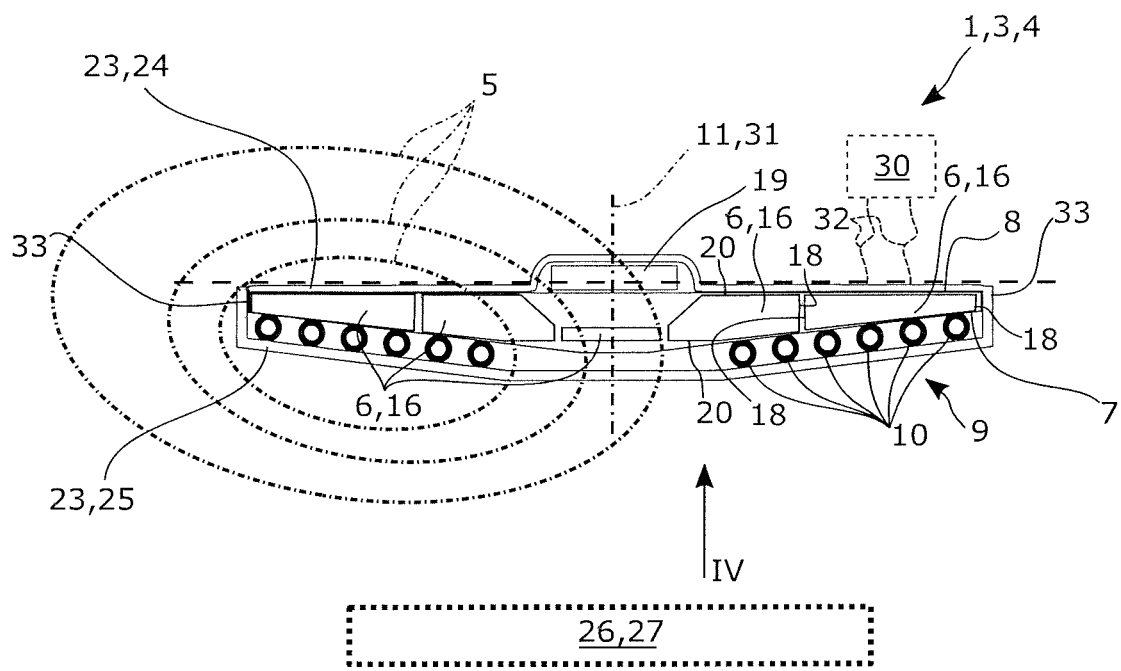
FIG. 3 shows in a sectional view, a further preferred exemplary embodiment of the energy transmitter, wherein again dash-dotted magnetic field lines represent the interaction of the same with a counter-energy transmitter arranged on the energy transmitter.
Figure 4:
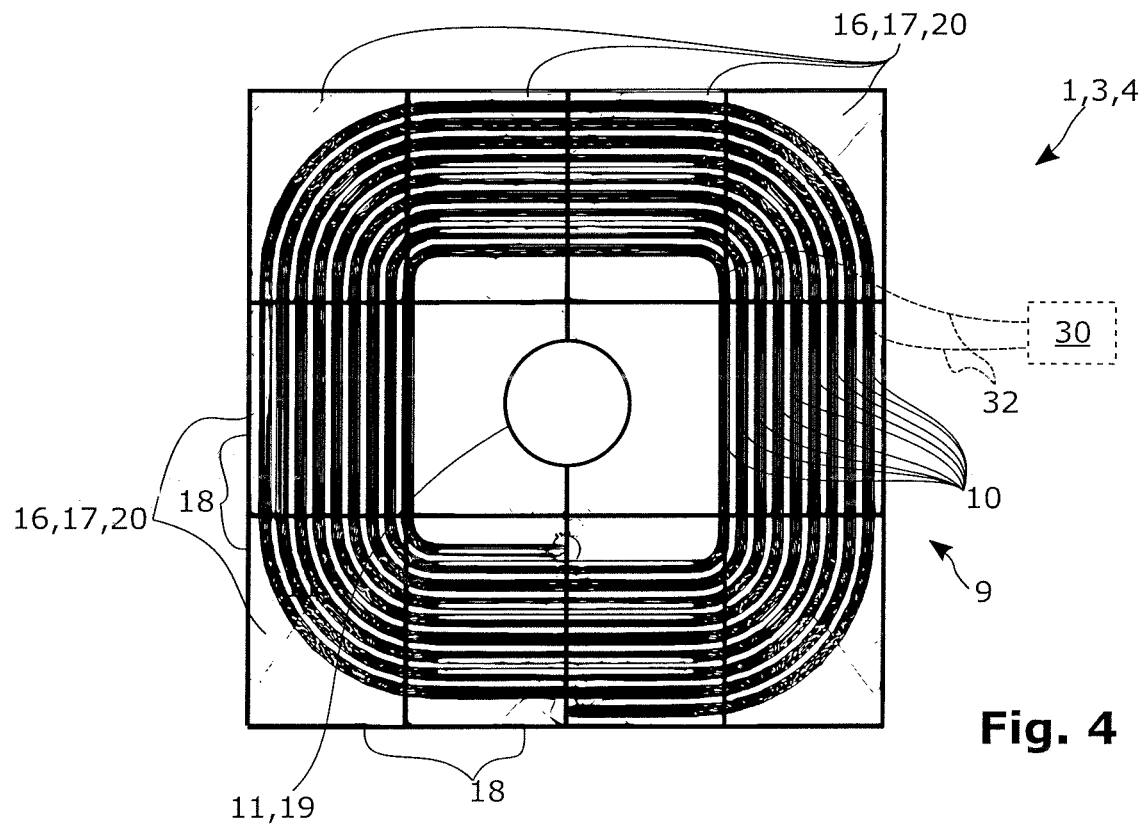
FIG. 4 shows the energy transmitter from FIG. 3 according to an arrow IV drawn in there, wherein again for the purpose clarity a housing of the energy transmitter is shown partly transparently.

FIGS. 3 and 4 show in a sectional view a further preferred exemplary embodiment of the energy transmitter 1, wherein again dash-dotted magnetic field lines 5 of a magnetic field represent the interaction of the same with a counter-energy transmitter 26 with receiver coil device 27 arranged on the energy transmitter 1. The components of the exemplary embodiments shown in FIGS. 3 and 4 have, insofar as in terms of function and/or configuration these are similar or identical to the components according to the first exemplary embodiment, have been given the same reference numbers as in FIGS. 1 and 2 in order to spare repetitions. In contrast with the exemplary embodiment according to the FIGS. 1 and 2, the magnetic conducting body 6 according to FIGS. 3 and 4 is embodied rectangular. It preferably comprises at least two tile bodies 16, according to FIG. 4 even 12 tile bodies 16 are noticeable. Each of the tile bodies 16 is preferably formed by a cuboid flat body 17, so that the tile bodies 16 can be assembled in the manner of a puzzle, lying against one another while forming a relatively small intermediate gap or in contact with one another. In particular, intermediate gaps unfavourably influencing the homogeneity of the magnetic flux density between the tile bodies 16 can be avoided or reduced when, preferentially circumferential, contact edges 18 or contact surfaces 18 of the tile bodies 16 are surface-ground as part of a grinding method. Practically, two large tile body surfaces 20 of the tile bodies 16 are each orientated opposite to one another, wherein the one large tile body surface can be configured flat and the large tile body surface orientated in opposite direction with respect to the other large tile body surface can be configured flat, oblique or domed or complex. By way of this it is achieved altogether that the magnetic conducting body 6 has a flat large magnetic body surface 8 and a for example flat, oblique or curved large magnetic body surface 7. Furthermore it is provided in the exemplary embodiment according to FIGS. 3 and 4 to arrange on or in the region about the imaginary coil winding centre 11, at least one electronic component 19. The electronic component 19 can comprise in particular power electronics, for example an oscillating circuit or the like, preferably the same is robust relative to magnetic scattering fields.

Figure 5:
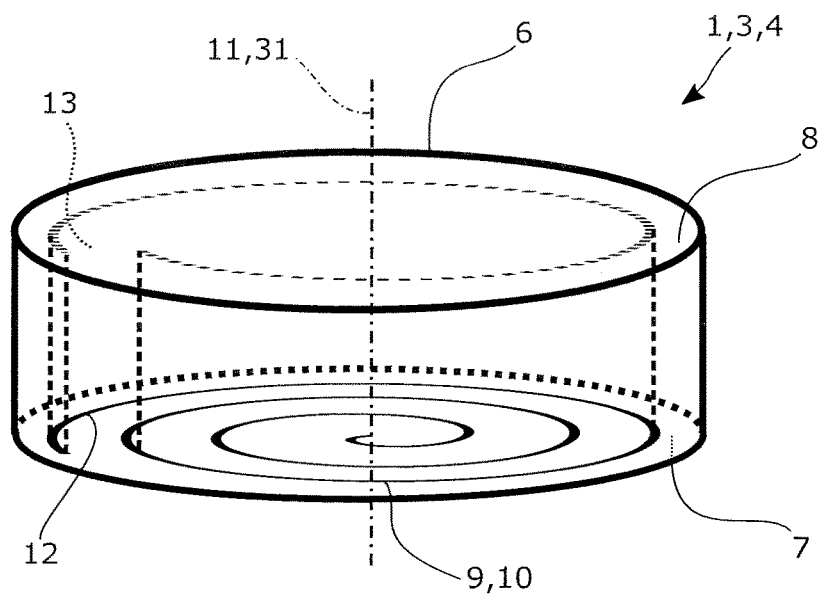
FIG. 5 shows in a perspective view, a greatly simplified representation of a magnetic conducting body of an energy transmitter with a circumference section area indicated in dashed line.

FIG. 5 shows in a perspective view a greatly simplified representation of a magnetic conducting body 6 of an energy transmitter 1 with a circumference section area 13 indicated in dashed lines. The components of the exemplary embodiment shown in FIG. 5, so far as these are similar or identical in function and/or configuration to the components according to the first and second exemplary embodiment, have received the same reference numbers as in FIGS. 1 to 4, in order to spare repetitions. It is substantial now that between the coil windings 10 of the coil 9 and a large magnetic body surface 8 facing away from the coil multiple imaginary circumference section areas 13 are defined, wherein here for the sake of clarity merely a single circumference section area 13 is shown. Each circumference section area 13 runs along the spiral coil winding circumferential length 12 of a coil winding 10 through the magnetic conducting body 6 between the two large magnetic body surfaces 7, 8. The magnetic conducting body 6 is configured in design so that at least two circumference section areas 13 in terms of area are substantially identical to one another in order to achieve a relatively homogeneous distribution of the magnetic flux density or of the temperature load. Practically, two or all circumference section areas 13 are arranged identically or practically identically relative to one another in terms of area. By way of this, a homogeneous distribution of the magnetic flux density and/or of the temperature during the operation of the energy transmitter 1 can materialise.

Figure 6:
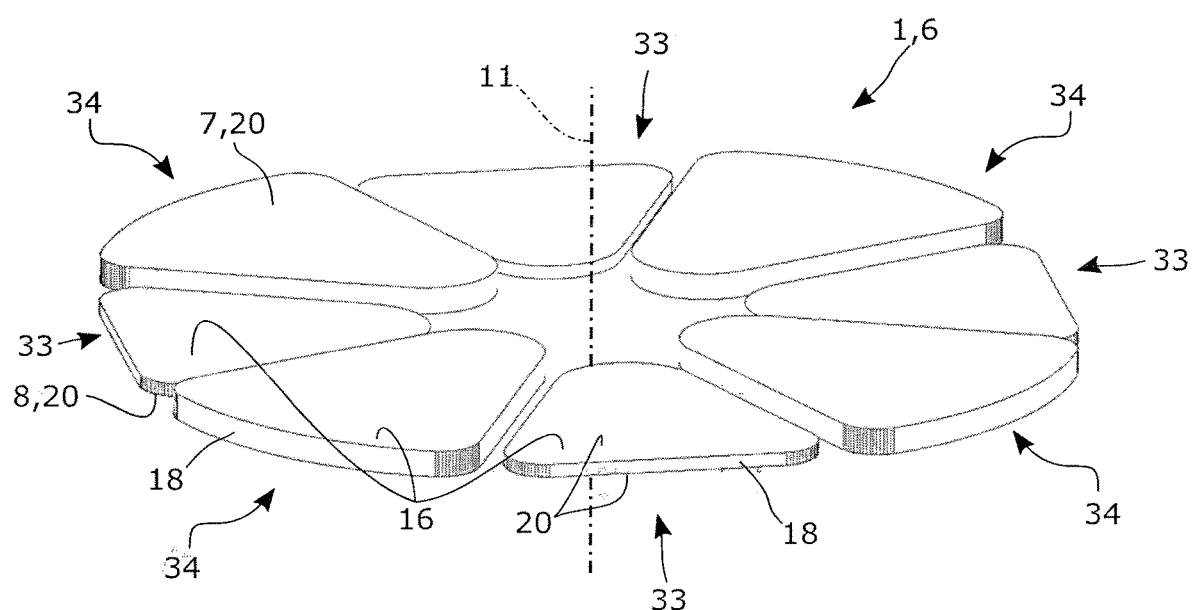
FIG. 6 shows in a perspective view, a preferred exemplary embodiment of a magnetic conducting body of a preferred energy transmitter.

In FIG. 6, a preferred exemplary embodiment of a magnetic conducting body 6 for conducting a magnetic field is shown in a perspective view, which practically is part of a preferred energy transmitter 1, in particular according to the above description. Energy transmitters 1 are suitable for a contactless energy transmission and for this purpose are equipped with at least one coil device 4, which is not shown, for providing a magnetic field for a contactless energy transmission or for receiving a magnetic field from a contactless energy transmission. Furthermore, the magnetic conducting body 6 of the energy transmitter 1 comprises two large magnetic body surfaces 7, 8. The coil device 4 in turn comprises a coil 9 arranged on the coil-facing first large magnetic body surface 7 which is not shown, of multiple coil windings 10, wherein each coil winding 10 is circulatingly arranged coil-like along a circumferential direction round about an imaginary coil winding centre 11 of the coil 9 and defines a coil winding circumferential length 12. In any case, a magnetic conducting body thickness of the magnetic conducting body 6 defined between the two large magnetic body surfaces 7, 8 is adapted in the circumferential direction round about the coil winding centre 11 at any point along a coil winding circumferential length 12 according to a predetermined or predeterminable change function, so that the magnetic conducting body thickness, preferentially in edge regions 34 or corner edge regions 34, the magnetic conducting body 6 is thicker or thinner than in intermediate edge regions 33 of the magnetic conducting body 6 between the edge regions 34 or the corner edge regions 34. According to FIG. 1 it is noticeable, furthermore, that the magnetic conducting body 6 is composed of multiple tile bodies 16, which are distributed rim-like round about the coil winding centre 11, wherein between two tile bodies 16 that are adjacent in the circumferential direction round about the coil winding centre 11 an intermediate gap can be formed. Two tile bodies 16 that are adjacent in the circumferential direction round about the coil winding centre 11 can also lie against one another so as to be in contact and gap-free. Each tile body 16 has two large tile body surfaces 20 that are orientated opposite to one another and an outer surface or edge connecting these, which is also referred to as contact edge 18 or contact surface 18. Here, the large tile body surfaces 20 are each orientated transversely to the coil winding centre 11 and substantially triangular in surface shape, although surface shapes deviating from this are also conceivable. In FIG. 1 it is noticeable, furthermore, that the tile bodies 16 are configured in the circumferential direction round about the coil winding centre 11 each with different thickness, i.e. different magnetic conducting body thicknesses in the circumferential direction round about the coil winding centre 11 each. In the radial direction, the respective tile bodies 16 are constant in the magnetic conducting body thickness. Here, the magnetic conducting body thickness preferably refers to the gap between two large tile body surfaces 20 of a tile body 16. It is preferred, furthermore, when relatively thin and relatively thick tile bodies 16 alternate one another in the circumferential direction round about the coil winding centre 11, so that a tile body 16 embodied relatively thin is followed by a tile body 16 embodied relatively thick. In particular, the intermediate edge regions 33 of the magnetic conducting body 6 between the corners of the magnetic conducting body 6 are configured thinner than the corner edge regions 34 of the magnetic conducting body 6. It can also be said that a wave-like thickness profile of the magnetic conducting body thickness of the magnetic conducting body 6 in the circumferential direction round about the coil winding centre 11 along a coil winding circumferential length 12 is realised, wherein practically wave crests and wave troughs follow one another so that wave troughs are arranged in intermediate edge regions 33 and/or wave crests in corner edge regions 34 of the magnetic conducting body 6. By way of this, a particularly homogeneous magnetic field density distribution within the energy transmitter 1 is achieved.

Figure 7:
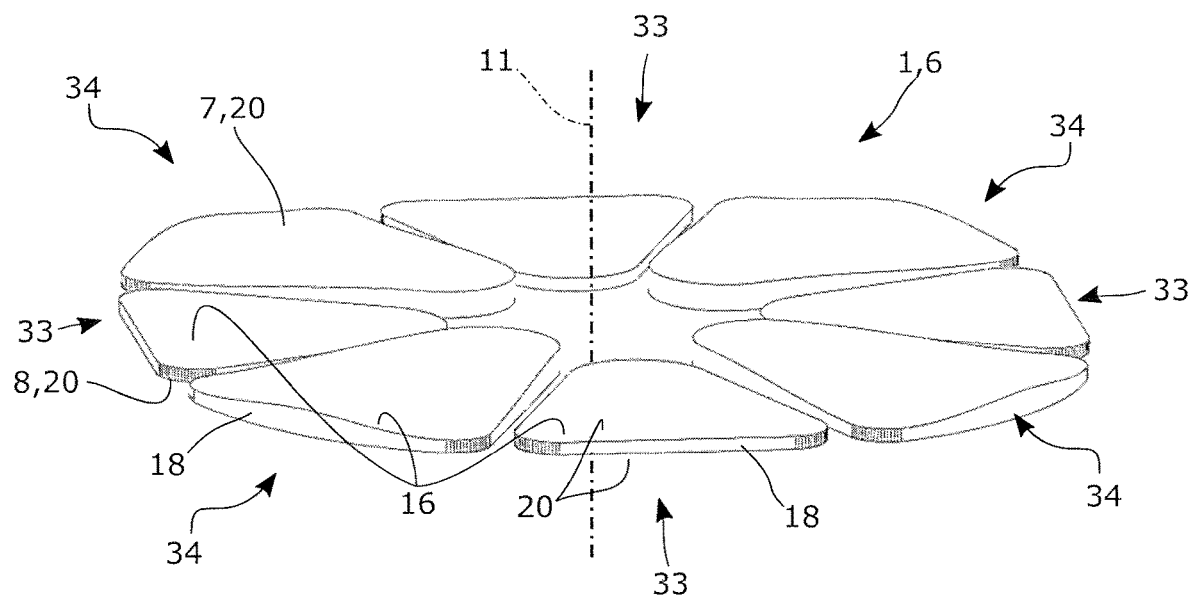
FIG. 7 shows in a perspective view a further preferred exemplary embodiment of a magnetic conducting body of a preferred further energy transmitter.

In FIG. 7, a further preferred exemplary embodiment of a magnetic conducting body 6 of tile bodies 16 of a preferred further energy transmitter 1 is noticeable in a perspective view. The tile bodies 16 differ from the tile bodies 16 according to FIG. 6 merely in that the magnetic conducting body thickness of the tile bodies 16 varies in the radial direction, i.e. in that the magnetic conducting body thickness of at least one tile body 16 is not constant in the radial direction. For example, a tile body 16 is configured relatively thick at the end of the tile body 16 orientated towards the coil winding centre 11, while the end of the tile body 16 facing away from the coil winding centre 11 is configured relatively thin. Furthermore it is conceivable that for example a tile body 16 is configured relatively thin at the end of the tile body 16 orientated towards the coil winding centre 11, while the end of the tile body 16 facing away from the coil winding centre 11 is configured relatively thick. Obviously, other thickness profiles in the radial direction are also conceivable, for example domed thickness profiles or thickness profiles according to a mathematical function. In addition, at least one single tile body 16 can have different magnetic conducting body thicknesses in the circumferential direction round about the coil winding centre 11, for example a single tile body 16 is configured relatively thin towards its respective body edges while its body centre is configured relatively thick.

Figure 8:
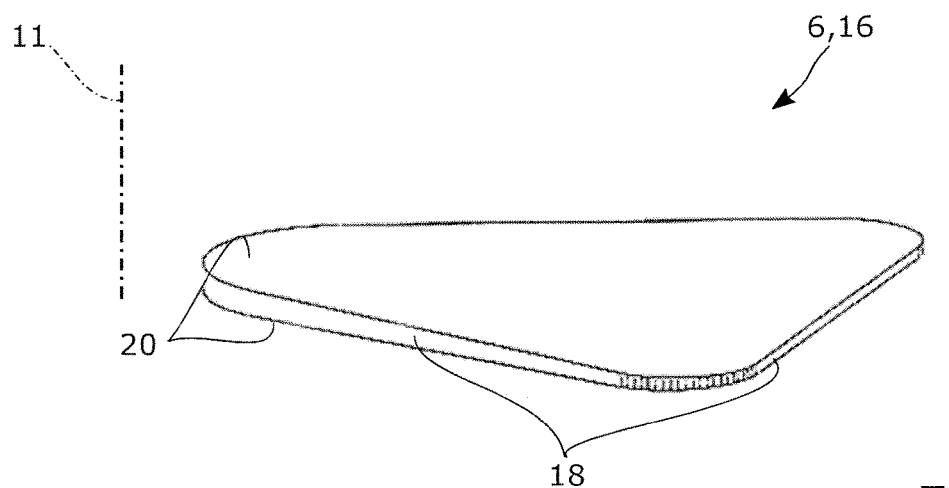
FIG. 8 shows in a perspective view a preferred exemplary embodiment of a tile body of a magnetic conducting body and FIG. 9 shows in a perspective view, a further preferred exemplary embodiment of a further tile body of a further magnetic conducting body.

FIG. 8 shows in a perspective view a preferred exemplary embodiment of a single tile body 16 of a magnetic conducting body 6 of a preferred energy transmitter 1, in particular a tile body 16 according to the exemplary embodiments shown in FIGS. 1 to 7. It is noticeable that the tile body 16 comprises two large tile body surfaces 20 orientated opposite to one another and an outer surface or edge connecting these to one another, which is also referred to as contact edge 18 or contact surface 18. Starting out from its end that is smaller in terms of area and faces the coil centre 11 in the assembled state of the energy transmitter 1, the tile body 16 has a magnetic conducting body thickness that is constantly decreasing along its main extension direction so that it is relatively thick at its one end and relatively thin at the end facing away from the former. It is preferred when all or at least one single edge of the tile body 16 is rounded, i.e. provided with radius.

Figure 9:
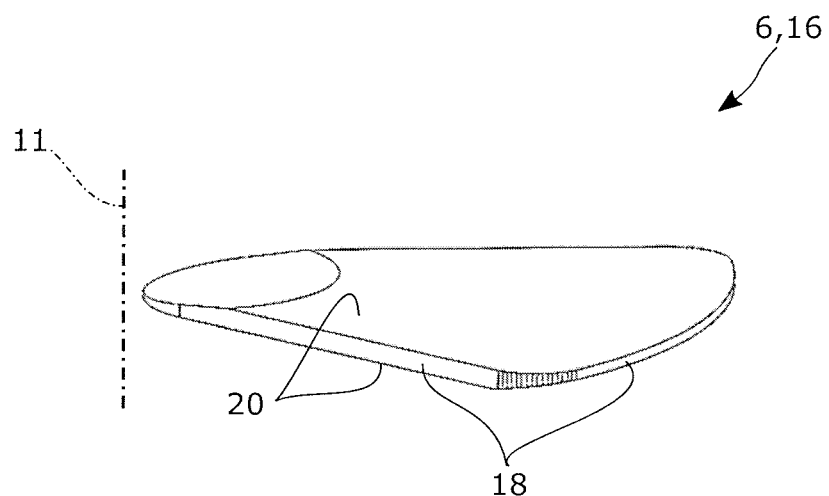

Finally, FIG. 9 shows in a perspective view a further preferred exemplary embodiment of a tile body 16 of a magnetic conducting body 6 of a further preferred energy transmitter 1, in particular a tile body 16 according to the exemplary embodiments shown in FIGS. 1 to 7. It is noticeable that the tile body 16 again comprises two large tile body surfaces 20 which are orientated opposite to one another and an outer surface or edge connecting these, which is also referred to as contact edge 18 or contact surface 18. From its end that is smaller in terms of area and in the assembled state of the energy transmitter 1 faces the coil centre 11, the tile body 16 has a magnetic conducting body thickness that is constant along its main extension direction. Merely in the region of its end and the end of the tile body 16 facing away from the former, a slope or flattened portion each is provided, so that the tile body 16 ends thin or tapers in each case towards its ends, quasi in the radial direction. It is preferred when all or at least one single edge of the tile body 16 is rounded, i.e. provided with a radius.

The invention claimed is:

1. An energy transmitter for a contactless energy transmission, comprising:
   a coil device configured to at least one of i) provide a magnetic field for a contactless energy transmission and ii) receive a magnetic field from the contactless energy transmission;
   a magnetic conducting body having two large magnetic body surfaces for conducting the magnetic field;
   the coil device including a coil arranged on a coil-facing first large magnetic body surface of the two large magnetic body surfaces, the coil including a plurality of coil windings;
   each coil winding of the plurality of coil windings circumferentially arranged about an imaginary coil winding centre of the coil in a coil-like manner and defining a coil winding circumferential length;
   a plurality of imaginary circumference section areas defined between the two large magnetic body surfaces which each extend along the coil winding circumferential length of a corresponding coil winding of the plurality of coil windings and through the magnetic conducting body between the two large magnetic body surfaces; and
   wherein the magnetic conducting body is configured such that at least two circumference section areas of the plurality of circumference section areas are substantially identical to one another in terms of area.

2. The energy transmitter according to claim 1, wherein all of the plurality of circumference section areas of the plurality of coil windings are identical to one another.

3. The energy transmitter according to claim 1, wherein at least one of the plurality of circumference section areas defines a reference area with respect to which a remainder of the plurality of circumference section areas deviate in terms of area at least one of:
   by a maximum of one of 1%, 2%, 3%, 4%, 5%, 6%, 7%, 8%, 9% and 10%;
   by at least one of a predetermined parameter and a predeterminable parameter; and according to at least one of a predetermined deviation function and a predeterminable deviation function.

4. The energy transmitter according to claim 1, wherein the two large magnetic body surfaces further includes a second large magnetic body surface facing away from the coil, and wherein at least one of:
the two large magnetic body surfaces are inclined relative to one another;
the second large magnetic body surface is flat and the first large magnetic body surface is configured at least one of oblique and domed with respect to the second large magnetic body surface; and
the second large magnetic body surface is configured flat and the first large magnetic body surface is configured one of conical shaped, truncated cone-shaped, pyramid-shaped, truncated pyramid-shaped and stepped pyramid-shaped.

5. The energy transmitter according to claim 1, wherein the magnetic conducting body, one of at and in a region about the coil winding centre, includes at least one of a recess and a magnetic conducting body recess penetrating the magnetic conducting body.

6. The energy transmitter according to claim 1, wherein one of:
the magnetic conducting body is structured in one piece; and
the magnetic conducting body is structured as a plurality of parts and includes at least two tile bodies which are assemblable in a puzzle-like manner.

7. The energy transmitter according to claim 6, wherein the at least two tile bodies are formed powder-metallurgically as part of a sintering method.

8. The energy transmitter according to claim 6, wherein the at least two tile bodies include at least one of i) a plurality of surface-ground contact edges and ii) a plurality of surface-ground contact surfaces such that, when in an assembled state, intermediate gaps between the at least two tile bodies are at least one of avoided and reduced.

9. The energy transmitter according to claim 6, wherein each of the at least two tile bodies includes two large tile body surfaces, and wherein at least one of:
the two large tile body surfaces are flat and are orientated opposite to one another; and
the two large tile body surfaces includes a first large tile body surface facing away from the coil and a second large tile body surface facing the coil, the first large tile body surface configured level, and the second large tile body surface configured at least one of oblique and domed towards the first large tile body surface.

10. The energy transmitter according to claim 1, wherein the plurality of coil windings are surface-followingly arranged spaced apart from one another with a gap of one of 0.1 mm, 0.2 mm, 0.5 mm, 1.0 mm, 1.5 mm, 2.0 mm, 2.5 mm, 3.0 mm, 4.0 mm and 5.0 mm on the first large magnetic body surface.

11. The energy transmitter according to claim 1, wherein the plurality of coil windings are touchingly arranged on the first large magnetic body surface.

12. The energy transmitter according to claim 1, wherein the plurality of coil windings define at least one of:
a flat winding plane and form a flat coil;
a conical coil tapered surface;
a truncated cone-shaped coil tapered surface;
a pyramid-shaped coil tapered surface;
a truncated pyramid-shaped coil tapered surface; and
a stepped pyramid-shaped coil tapered surface.

13. The energy transmitter according to claim 1, further comprising a multi-part housing including a housing cover and a housing bowl, wherein:
the housing bowl is structured to receive the coil device and the magnetic conducting body; and
the housing cover is structured to cover the housing bowl.

14. A traction accumulator charging system, comprising:
an energy transmitter including:
a magnetic conducting body having two large magnetic body surfaces for conducting a magnetic field, the two large magnetic body surfaces including a coil-facing first large magnetic body surface;
a coil device configured to provide the magnetic field, the coil device including a coil arranged on the first large magnetic body surface, the coil including a plurality of coil windings each i) circumferentially arranged about an imaginary coil winding centre of the coil in a coil-like manner and ii) defining a coil winding circumferential length;
a plurality of imaginary circumference section areas each extending along the coil winding circumferential length of a corresponding coil winding of the plurality of coil windings and through the magnetic conducting body between the two large magnetic body surfaces;
the magnetic conducting body configured such that at least two circumference section areas of the plurality of circumference section areas are substantially identical to one another in terms of area; and
a multi-part housing for receiving the coil device and the magnetic conducting body;
a counter-energy transmitter including at least one receiver coil device interacting with the coil device in an energy transmitting manner; and
wherein the receiver coil device is configured in an identical manner to the coil device.

15. An energy transmitter for a contactless energy transmission, comprising:
a coil device configured to at least one of i) provide a magnetic field for a contactless energy transmission and ii) receive a magnetic field from the contactless energy transmission;
a magnetic conducting body having two large magnetic body surfaces for conducting the magnetic field;
the coil device including a coil, the coil including a plurality of coil windings arranged on a coil-facing first large magnetic body surface of the two large magnetic body surfaces;
each coil winding of the plurality of coil windings circulatingly arranged coil-like along a circumferential direction extending about an imaginary coil winding centre of the coil and defining a coil winding circumferential length; and
wherein the magnetic conducting body has a magnetic conducting body thickness defined between the two large magnetic body surfaces that is adaptable in the circumferential direction at any point along the coil winding circumferential length of at least one of the plurality of coil windings according to at least one of a predetermined change function and a predeterminable change function such the magnetic conducting body thickness is at least one of thicker and thinner in at least one of i) a plurality of edge regions of the magnetic conducting body and ii) a plurality of corner edge regions of the magnetic conducting body than in a plurality of intermediate edge regions of the magnetic conducting body, which in turn are located disposed between the at least one of i) the plurality of edge regions and ii) the plurality of corner edge regions.

16. The energy transmitter according to claim 15, wherein the at least one of the predetermined change function and the predeterminable change function is at least one of a jump function, a linear change function, and a non-linear change function that is dependent on a respective angle position and is continuous.

17. The energy transmitter according to claim 15, wherein:
the at least one of the predetermined change function and the predeterminable change function is configured such that the magnetic conducting body has a wave-shaped thickness profile in the circumferential direction along the coil winding circumferential length of at least one of the plurality of coil windings; and
the wave-shaped thickness profile includes a plurality of wave crests and a plurality of wave troughs disposed in an alternating manner such that at least one of i) the plurality of wave troughs and ii) the plurality of wave crests are arranged in the at least one of i) the plurality of edge regions and ii) the plurality of corner edge regions.

18. The energy transmitter according to claim 15, wherein at least one of:
the magnetic conducting body is one of i) a round flat body, ii) a quadrangular flat body with rounded corners, iii) a quadrangular flat body without rounded corners, iv) a polygonal flat body with rounded corners, and v) a polygonal flat body with or without rounded corners; and
the magnetic conducting body has a wave-shaped thickness profile in the circumferential direction along the coil winding circumferential length of at least one of the plurality of coil windings, the wave-shaped thickness profile including a plurality of wave crests and a plurality of wave troughs disposed in an alternating manner such that at least one of i) the plurality of wave troughs and ii) the plurality of wave crests are arranged in the plurality of intermediate edge regions.

19. The energy transmitter according to claim 15, wherein one of:
the magnetic conducting body is structured in one piece; and
the magnetic conducting body is structured as a plurality of pieces and includes at least two tile bodies which are assemblable in a puzzle-like manner, the at least two tile bodies structured as flat bodies that have rounded corners.

20. The energy transmitter according to claim 2, wherein the magnetic conducting body has a magnetic conducting body thickness defined between the two large magnetic body surfaces that is adaptable in the circumferential direction at any point along the coil winding circumferential length of at least one of the plurality of coil windings according to at least one of a predetermined change function and a predeterminable change function such that the magnetic conducting body thickness, in at least one of i) a plurality of edge regions of the magnetic conducting body and ii) a plurality of corner edge regions of the magnetic conducting body is at least one of thicker and thinner than in a plurality of intermediate edge regions of the magnetic conducting body, which are disposed between the at least one of i) the plurality of edge regions and ii) the plurality of corner edge regions.

* * * * *